(12) United States Patent
Keating et al.

(10) Patent No.: US 11,310,762 B2
(45) Date of Patent: Apr. 19, 2022

(54) METHOD FOR IDLE-MODE POSITIONING OF UES USING OBSERVED TIME DIFFERENCE OF ARRIVAL

(71) Applicant: Nokia Technologies Oy, Espoo (FI)

(72) Inventors: Ryan Keating, Chicago, IL (US); Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 6 days.

(21) Appl. No.: 16/703,051

(22) Filed: Dec. 4, 2019

(65) Prior Publication Data

US 2020/0229130 A1 Jul. 16, 2020

Related U.S. Application Data

(60) Provisional application No. 62/791,292, filed on Jan. 11, 2019.

(51) Int. Cl.
*H04W 4/00* (2018.01)
*H04W 64/00* (2009.01)
(Continued)

(52) U.S. Cl.
CPC ..... *H04W 64/006* (2013.01); *H04W 52/0229* (2013.01); *H04W 72/048* (2013.01)

(58) Field of Classification Search
CPC .............................. H04W 4/029; H04W 64/00
See application file for complete search history.

(56) References Cited

U.S. PATENT DOCUMENTS 6,526,030 B2 * 2/2003 Rezaiifar .......... H04W 72/0406
370/335
8,170,556 B2 5/2012 Lee et al.
(Continued)

FOREIGN PATENT DOCUMENTS

WO 2018/136224 A2 7/2018

OTHER PUBLICATIONS

"3rd Generation Partnership Project;Technical Specification Group Radio Access Network; Evolved Universal Terrestrial Radio Access (E-UTRA); LTE Positioning Protocol (lpp) (Release 15)", 3GPP TS 36.355, V15.1.0, Sep. 2018, pp. 1-217.
(Continued)

*Primary Examiner* — Omoniyi Obayanju
(74) *Attorney, Agent, or Firm* — Nokia Technologies Oy

(57) ABSTRACT

A method includes receiving positioning configuration information from a base station or location server while in an RRC_connected mode; transitioning to an RRC_idle or RRC_inactive mode, while saving the positioning configuration information; receiving a reference signal for positioning from the base station; performing positioning measurements, while in the RRC_idle or RRC_inactive mode; and sending a location report to the base station or location server while remaining in the RRC_idle or RRC_inactive mode. A related method includes sending positioning configuration information to a user equipment in an RRC_connected mode; sending the user equipment to RRC_idle or RRC_inactive mode by an RRC suspend procedure; sending a reference signal for positioning to the user equipment; receiving a location report from the user equipment in the RRC_idle or RRC_inactive mode; and forwarding the location report from the user equipment to a location server.

17 Claims, 10 Drawing Sheets

(51) Int. Cl.
*H04W 52/02* (2009.01)
*H04W 72/04* (2009.01)

(56) References Cited

U.S. PATENT DOCUMENTS

| | | | |
|---|---|---|---|
| 2010/0323719 A1* | 12/2010 | Jen | H04W 64/00 |
| | | | 455/456.1 |
| 2017/0188270 A1* | 6/2017 | Shan | H04W 36/0022 |
| 2018/0054796 A1 | 2/2018 | Edge | |
| 2018/0343635 A1 | 11/2018 | Edge et al. | |
| 2019/0182794 A1* | 6/2019 | Wong | H04W 52/0209 |
| 2019/0349881 A1* | 11/2019 | Choi | H04W 64/00 |
| 2020/0053555 A1* | 2/2020 | Gunnarsson | H04W 76/28 |
| 2021/0045083 A1* | 2/2021 | Liu | H04W 68/00 |

OTHER PUBLICATIONS

Fischer, "Observed Time Difference of Arrival (OTDOA) Positioning in 3GPP LTE", Qualcomm Technologies, Inc., Jun. 6, 2014, pp. 1-62.

"Summary of RAT Dependent Positioning Methods in 7.2.10.3 at RAN1#95", 3GPP TSG-RAN WG1 #95, R1-1813593, Agenda : 7.2.10.3, Ericsson, Nov. 12-16, 2018, pp. 1-7.

"Potential RAT-Dependent Techniques for NR Positioning", 3GPP TSG RAN WG1 Meeting #95, R1-1813143, Agenda : 7.2.10.3, Nokia, Nov. 12-16, 2018, 6 pages.

"Revised SID: Study on NR Positioning Support", 3GPP TSG RAN Meeting #81, RP-182155, Agenda : 9.3.18, Intel Corporation, Sep. 10-13, 2018, 6 pages.

"Idle Mode Positioning Solutions", 3GPP TSG-RAN WG1 #95, R1-1813591, Agenda : 7.2.10.4, Ericsson, Nov. 12-16, 2018, pp. 1-3.

Roessler et al., "LTE—Advanced (3GPP Rel.11) Technology Introduction", Rohde & Schwarz, 2013, pp. 1-39.

"UE Positioning in LTE for Surveillance", Altran, Retrieved on Nov. 13, 2019, Webpage available at: https://connect.altran.com/2016/09/ue-positioning-in-lte-for-surveillance/.

\* cited by examiner

METHOD FOR IDLE-MODE POSITIONING OF UES USING OBSERVED TIME DIFFERENCE OF ARRIVAL

TECHNICAL FIELD

This disclosure relates to timing measurements made at a user equipment for reporting to a location server (LS) for a positioning calculation. More specifically, this disclosure relates to the performance of such measurements while the user equipment is not in a connected mode.

BACKGROUND

The ability of devices in wireless networks to know their positions continues to be one of their important features. Some nodes in a wireless network, such as base stations, for example eNBs or gNBs, may already be aware of their positions; these nodes are sometimes called anchor nodes.

Radio frequency (RF) signals inherently carry positioning information. Using RF measurements, it may be possible to determine the location of a device. Positioning schemes typically rely on timing-based techniques, angle-based techniques, or on a hybrid technique, in which both timing- and angle-based techniques are used.

In timing-based techniques, time of arrival (TOA) or time difference of arrival (TDOA) estimates are used to determine the distance between the transmitting and receiving nodes, based on the known speed of light. Once these distance estimates are known, a trilateration algorithm may be used to calculate the position of a node, when a sufficient number of reference points is used.

In LTE, a major solution to the positioning problem is the observed time difference of arrival (OTDOA). In OTDOA, timing measurements are made at a UE and then reported to a location server (LS) for a positioning calculation. A reference signal, referred to as the positioning reference signal (PRS), for making the OTDOA measurements has been introduced in LTE. Specifically, an eNB sends assistance information to a UE in order for the UE to make the measurements using the PRSs for the serving cell and for neighboring cells. Generally, the serving cell timing is used as the reference time for the TDOA measurements.

UEs that are in the network are considered to belong to different RRC modes or states relative to the network. In 5G NR, these modes include the RRC_connected, the RRC_inactive, and the RRC_idle states. When a UE is RRC_idle state, it is only monitoring the network for paging and system information. When a UE is in the RRC_connected state, it has established an RRC connection with the network. The location of the UE is known at a cell level and the UE can communicate with the gNB using the typical NR physical channels and procedures. In NR, RRC_inactive state was introduced which allows the UE's RRC connection to the network to be suspended and quickly resumed. When a UE is RRC_idle and RRC_inactive, it is able to save power relative to that required when it is RRC_connected.

The LTE Positioning Protocol (LPP) has been introduced in 3GPP TS 36.355 for exchanging required information and OTDOA measurements between the location server (LS), referred to as the Enhanced Serving Mobile Location Center (E-SMLC), and the UE.

Positioning schemes in cellular access technology, such as LTE, rely on the network to calculate the positions of UEs using knowledge of its own positions and measurements made either at a base station or at a UE, and then relayed to the base station. This requires signaling between the UE and the base station (eNB for LTE and gNB for NR) after the measurements have been made. Typically, the gNB relays the measurement information, along with additional assistance information, to a location server (LS) for actual computation of the location estimate.

One of the defining features of future networks, such as new radio (NR), will be massive numbers of internet-of-things (IoT) UEs connected to the network. An important aspect of IoT UEs is that they have low power consumption. For a variety of IoT use cases, it is desirable to know the position of a device; however, making positioning measurements such as reference signal time difference (RSTD) measurements on the PRS can be costly in terms of power consumption.

Currently, when a UE wants to estimate its position using OTDOA, or when the network wants to estimate the position of a UE, and the UE is in either the RRC_idle state or the RRC_inactive state, the UE first needs to be paged to "wake up" before it can perform necessary location measurements and reporting. This requires the UE to establish an RRC connection and be in RRC_connected state prior to performing RSTD measurements and reporting the results. This means that the UE must undergo a state change (for example, from idle or inactive to active or connected state) and be moved to a traffic channel prior to location-related measurements and reporting. Typically, state change from RRC_idle to RRC_connected require several message exchanges between the network and UE. They can include Msg1 (preamble transmission), Msg2 (random access response), Msg3 (RRC connection request), Msg4 (RRC connection setup). In case of contention, further contention resolution messages are also needed. This is undesirable from the point of view of overhead and power consumption. The present invention addresses this issue.

FIG. 1 shows the current process for determining the position of a node in RRC_idle or RRC_inactive mode using OTDOA. To begin the process, a location server (LS) 102 sends a request to a base station (gNB) 104 for the position of a user equipment (UE) 106, which is in an RRC_idle state, in signal 108. In turn, gNB 104 pages UE 106 to "wake up" in signal 110, initiating an RRC connection resume process 112. Subsequently, gNB 104 requests location information from UE 106 in signal 114, and makes a positioning reference signal (PRS) transmission to UE 106 in signal 116. Next, UE 106 performs a reference signal time difference (RSTD) measurement 118, and sends a location report to gNB 104 in signal 120. In turn, gNB 104 passes the location report along to the location server in signal 122. An RRC suspend or release process 124 between UE 106 and gNB 104 is then carried out.

It should be understood, both above and in the discussion to follow, that the term "gNB" should be understood to mean "network node". The term "gNB" is used to denote a network node in 5G. However, it should be understood that the present invention, as described below, is not limited to 5G, but may be applicable to other generations yet to be developed. As a consequence, "gNB" should be understood more broadly as a network node.

SUMMARY

In a first aspect of the present disclosure, a method comprises: receiving positioning configuration information from a base station or location server while in an RRC_connected mode; transitioning to an RRC_idle or RRC_inactive mode, while saving said positioning configuration information; receiving a reference signal for positioning from the base station; performing positioning measurements, while in the RRC_idle or RRC_inactive mode; and sending a location report to the base station or location server while remaining in the RRC_idle or RRC_inactive mode.

In a second aspect of the present disclosure, an apparatus comprises: at least one processor; and at least one memory including computer program code, the at least one memory and the computer program code being configured, with the at least one processor, to cause the apparatus to perform the following: receive positioning configuration information from a base station or location server while in an RRC_connected mode; transition to an RRC_idle or RRC_inactive mode, while saving said positioning configuration information; receive a reference signal for positioning from the base station; perform positioning measurements, while in the RRC_idle or RRC_inactive mode; and send a location report to the base station or location server while remaining in the RRC_idle or RRC_inactive mode.

In a third aspect of the present disclosure, an apparatus comprises: means for receiving positioning configuration information from a base station or location server while in an RRC_connected mode; means for transitioning to an RRC_idle or RRC_inactive mode, while saving said positioning configuration information; means for receiving a reference signal for positioning from the base station; means for performing positioning measurements, while in the RRC_idle or RRC_inactive mode; and means for sending a location report to the base station or location server while remaining in the RRC_idle or RRC_inactive mode.

In a fourth aspect of the present disclosure, a computer program product comprises a non-transitory computer-readable storage medium bearing computer program code embodied therein for use with a computer, the computer program code comprising code for performing: receiving positioning configuration information from a base station or location server while in an RRC_connected mode; transitioning to an RRC_idle or RRC_inactive mode, while saving said positioning configuration information; receiving a reference signal for positioning from the base station; performing positioning measurements, while in the RRC_idle or RRC_inactive mode; and sending a location report to the base station or location server while remaining in the RRC_idle or RRC_inactive mode.

In a fifth aspect of the present disclosure, a method comprises: sending positioning configuration information to a user equipment in an RRC_connected mode; sending the user equipment to RRC_idle or RRC_inactive mode by an RRC suspend procedure; sending a reference signal for positioning to the user equipment; receiving a location report from the user equipment in the RRC_idle or RRC_inactive mode; and forwarding the location report from the user equipment to a location server.

In a sixth aspect of the present disclosure, an apparatus comprises: at least one processor; and at least one memory including computer program code, the at least one memory and the computer program code being configured, with the at least one processor, to cause the apparatus to perform the following: send positioning configuration information to a user equipment in an RRC_connected mode; send the user equipment to RRC_idle or RRC_inactive mode by an RRC suspend procedure; send a reference signal for positioning to the user equipment; receive a location report from the user equipment in the RRC_idle or RRC_inactive mode; and forward the location report from the user equipment to a location server.

In a seventh aspect of the present disclosure, an apparatus comprises: means for sending positioning configuration information to a user equipment in an RRC_connected mode; means for sending the user equipment to RRC_idle or RRC_inactive mode by an RRC suspend procedure; means for sending a reference signal for positioning to the user equipment; means for receiving a location report from the user equipment in the RRC_idle or RRC_inactive mode; and means for forwarding the location report from the user equipment to a location server.

In an eighth aspect of the present disclosure, a computer program product comprises a non-transitory computer-readable storage medium bearing computer program code embodied therein for use with a computer, the computer program code comprising code for performing: sending positioning configuration information to a user equipment in an RRC_connected mode; sending the user equipment to RRC_idle or RRC_inactive mode by an RRC suspend procedure; sending a reference signal for positioning to the user equipment; receiving a location report from the user equipment in the RRC_idle or RRC_inactive mode; and forwarding the location report from the user equipment to a location server.

BRIEF DESCRIPTION OF THE DRAWINGS

The foregoing and other aspects of these teachings are made more evident in the following detailed description, when read in conjunction with the attached drawing figures.

DETAILED DESCRIPTION

The present invention provides a method for a UE in RRC_idle or RRC_inactive mode or state to perform OTDOA positioning measurements and reporting without entering RRC_connected mode. The inventive steps of the invention are first summarized below. A more detailed description will follow.

According to the present invention:

A paging message is used in combination with a data transmission scheme during idle or inactive mode (e.g. early data transmission (EDT)/small data transmission (SDT)) and reserved identity (ID) for an idle/inactive mode OTDOA positioning procedure. A data transmission scheme during idle or inactive mode (e.g. early data transmission or small data transmission) refers to data transmission while the UE is still in RRC_idle or RRC_inactive state, generally during random access procedure (for example, data transmission as part of Msg2, Msg3, Msg4, or Msg5 in the random access procedure). Alternatively, data transmission scheme during idle or inactive mode can also occur without the need for random access, for example using preconfigured uplink resource.

The UE is flagged in the paging message from the network to perform the RRC_idle mode positioning procedure. In this way, the UE does not have to perform a state change to enter RRC_connected state or mode before performing positioning procedure.

Figure 2:
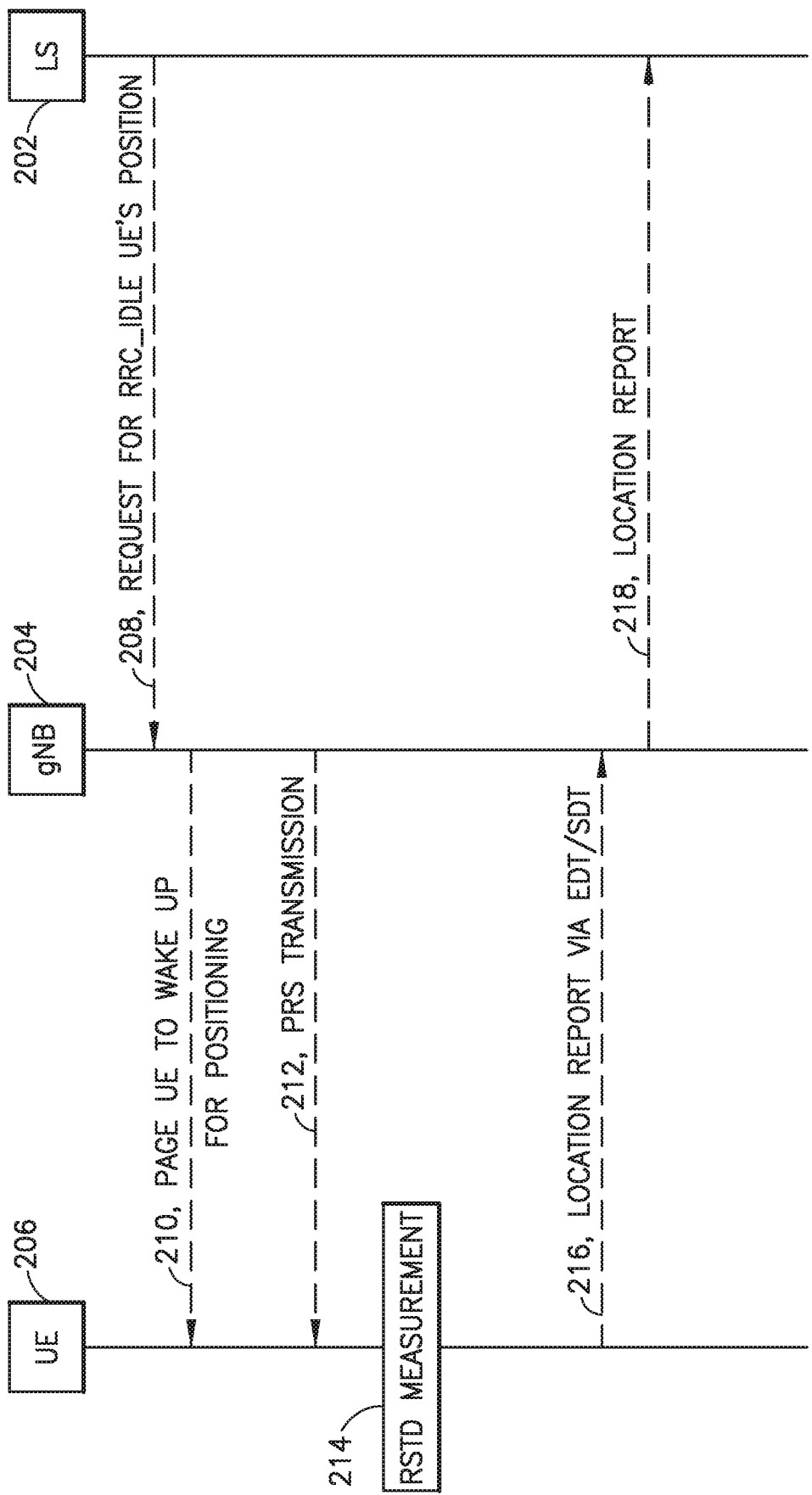
FIG. 2 illustrates the simplified signaling required using the present invention to position an RRC_idle or RRC_inactive UE using OTDOA.

FIG. 2 shows the messages needed for the RRC_idle or RRC_inactive mode procedure in this case. FIG. 2 will be described in more complete detail below.

When a UE is sent to RRC_idle or RRC_inactive mode, a suspend ID is set to those reserved for positioning, so gNBs/eNBs can recognize that the UE message needs to be forwarded to the LS.

Alternatively, when a UE which wants to use RRC_idle or RRC_inactive mode OTDOA positioning goes to idle or inactive state the suspend ID is forwarded on to neighboring cells, so they may recognize it.

UE uses a data transmission scheme during idle or inactive mode (e.g. EDT/SDT) to send an OTDOA measurement report to LS during random access procedure (for example, using PRACH or using Msg3 or Msg5).

The benefit of the present invention over prior art is the decrease in the signaling necessary for a UE to perform OTDOA positioning when starting in RRC_idle or RRC_inactive mode. The UE does not need to undergo a state change (for example, from RR idle or inactive to RRC active or connected state) and be moved to a traffic channel with the present invention. Typically, state change from RRC_idle to RRC_connected require several message exchanges between the network and UE. They can include Msg1 (preamble transmission), Msg2 (random access response), Msg3 (RRC connection request), Msg4 (RRC connection setup). In case of contention, further contention resolution messages are also needed. Therefore, the present invention has two major advantages over the prior art:

Less power consumption by the UE; this is particularly important for IoT devices.

Less signaling overhead in the network to setup RRC connections.

Figure 1:
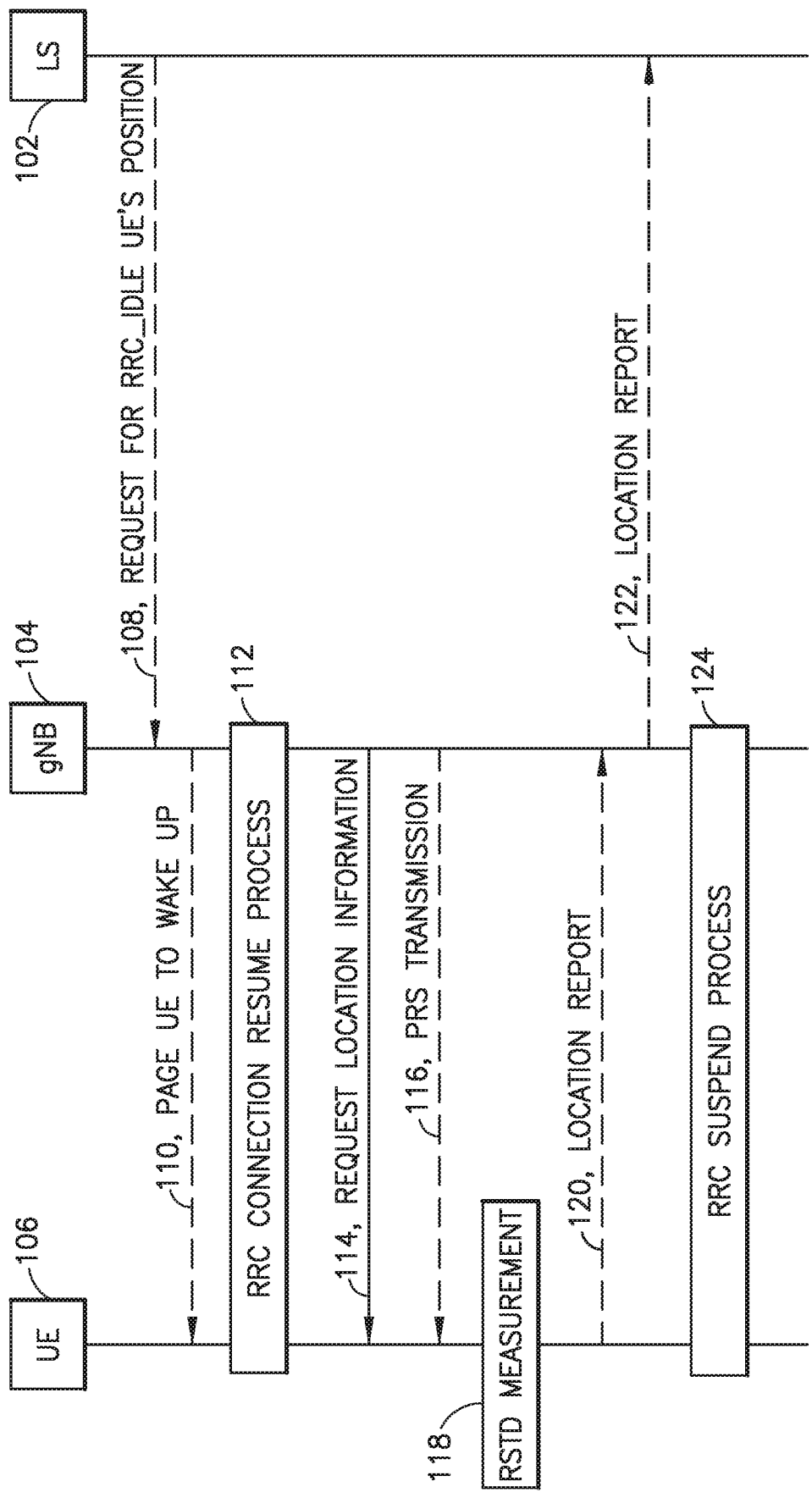
FIG. 1 illustrates the signaling required for positioning an RRC_idle or an RRC_inactive UE using OTDOA according to the prior art.

These advantages are apparent when comparing FIG. 1 with FIG. 2. It will be apparent that the RRC connection resume process 112, the "gNB 104 requests location information from UE 106 in signal 114", and the RRC suspend process 124 have been removed and do not appear in FIG. 2, as they are not required with the present invention.

According to the simplified signaling shown in FIG. 2, a location server (LS) 202 sends a request to a base station (gNB) 204 for the position of a user equipment (UE) 206, which is in an RRC_idle state, in signal 208. In turn, gNB 204 pages UE 206 to "wake up" for positioning in signal 210. Subsequently, gNB 204 makes a positioning reference signal (PRS) transmission to UE 206 in signal 212. Next, UE 206 performs a reference signal time difference (RSTD) measurement 214, and sends a location report via EDT/SDT (for example, using Msg3 or Msg5 during the random access procedure) to gNB 204 in signal 216. In turn, gNB 204 passes the location report along to the location server (LS) 202 in signal 218 to complete the signaling process.

FIGS. 1 and 2 show the procedure after the location server has determined to make a positioning request, which may require additional prior signaling in a UE-initiated case (and providing another advantage of the invention). It should be noted that the protocol described in the present disclosure could be initiated either by the UE or from the network side. This will be further discussed below.

As previously stated, the aim of the present invention is to allow a UE to make OTDOA measurements, for the purpose of positioning, while staying in RRC_idle or RRC_inactive mode.

Furthermore, the present invention can be applied also to other positioning techniques. For example, the UE may use Angle of Arrival (AoA) or Angle of Departure (AoD) information together with the gNB's position to determine its location. In this case, the UE receives information about the gNB's position and beams, including the AoD, while in connected mode and saves the information when transitioning to RRC_idle or RRC_inactive mode. The UE makes positioning measurements (for example, round trip time) and then reports this back to the network while still in idle or inactive mode.

The UE may also make Enhanced Cell ID (E-CID) related measurements (e.g., RSRP values on SSB) while in idle or inactive mode and use the present invention to report those measurements to the gNB or location server. The UE may receive E-CID assistance information while in connected mode and save the information when transitioning to idle or inactive mode.

The present invention can also be applied to RAT-independent positioning method like GNSS based positioning. The UE again may receive RAT-independent assistance information while in connected mode and save the information when transitioning to idle or inactive mode. The UE then makes the positioning report and any associated measurement while in the idle or inactive mode.

Background information that is relevant to the invention will now be summarized:

UE receives OTDOA and PRS configuration information from the gNB/eNB or location server while in RRC_connected mode using LPP and explicitly via System Information Block (SIB).

The key inventive steps of the invention are now described:

UE is sent to RRC_idle or RRC_inactive mode via RRC suspend or release procedure.

In one embodiment, the RRC suspend ID assigned to the UE is chosen from a predetermined set reserved for positioning. If this occurs, the gNB/eNB should message the LS to let it know that it is using this ID for a positioning UE which may be in RRC_idle or RRC_inactive mode.

UE saves the OTDOA and PRS configuration information when transitioning to RRC_idle or RRC_inactive mode.

UE makes positioning measurements (e.g. RSTD measurements).

Figure 4:
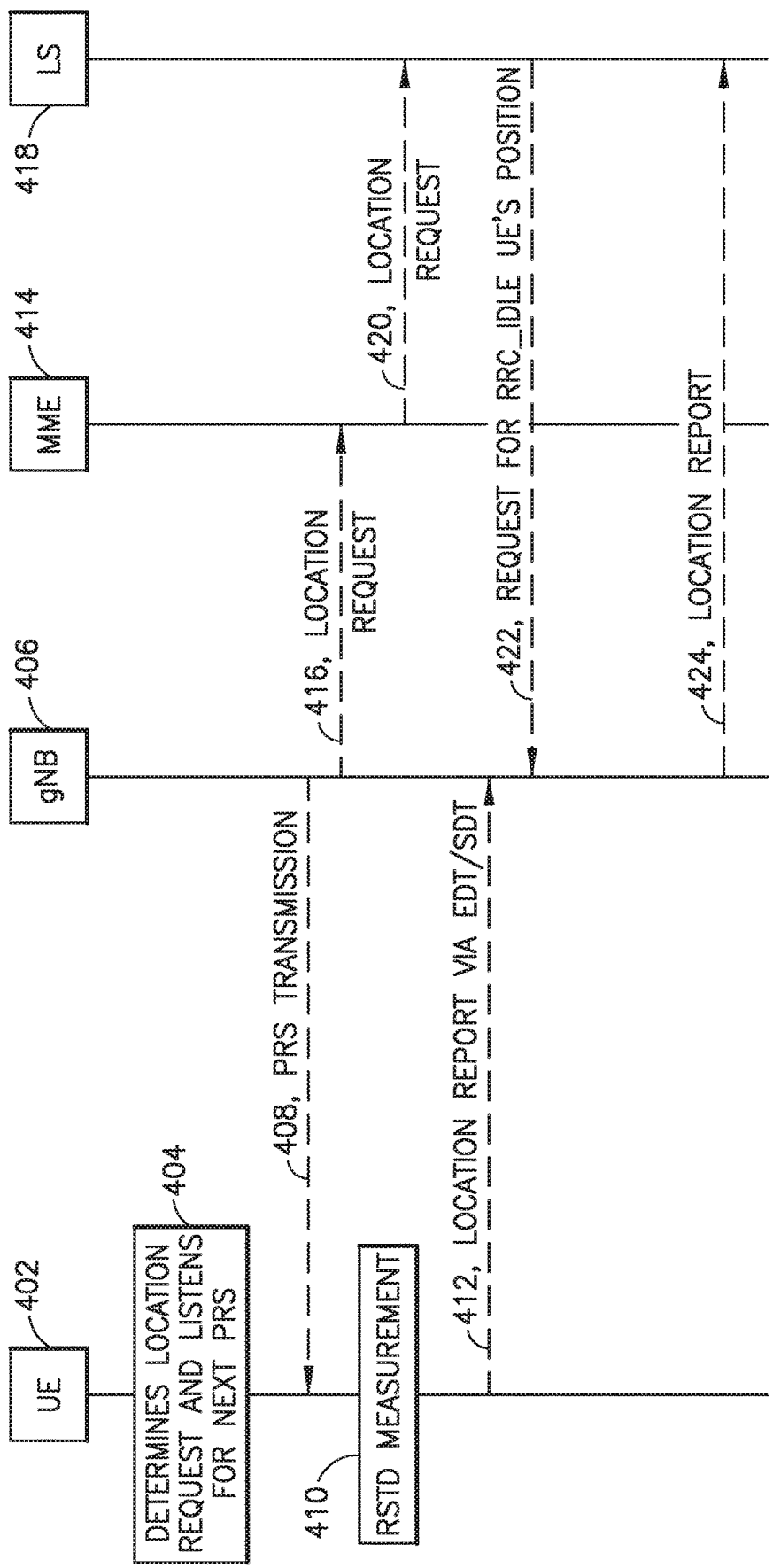
FIG. 4 illustrates the signaling for positioning when initiated by the UE in accordance with the present invention.

In one embodiment, the UE determines that it needs to position itself, waits for the next PRS transmission to occur and measures the needed RSTD. FIG. 4, to be discussed below, shows the signaling of the invention in this case.

In another embodiment, the network determines that it needs the position of a UE, sends a page to the UE with a flag set to wake up for positioning, and transmits PRS while the UE measures the needed RSTD. The network may indicate to the UE that this page is only to wake up to perform positioning and there is no pending downlink data for the UE. FIG. 2 shows the required signaling in this case.

UE uses a data transmission scheme during idle or inactive mode (e.g. EDT/SDT) to send the measurement report to the gNB/eNB or location server during random access procedure (for example, using PRACH or using Msg3 or Msg5). The UE then remains in RRC_idle or RRC_inactive mode.

If the UE has not moved from the serving cell it was last in RRC_connected mode with, then the gNB/eNB uses the RRC suspend ID to recognize the UE and passes the report on to the LS.

If the UE has moved into another serving cell, then, if the RRC suspend ID was set to those reserved for positioning, the gNB/eNB just forwards the idle or inactive mode message on to the LS along with the suspend ID used.

The LS uses the RSTD measurements to finish the OTDOA procedure and estimate the UE position. If the UE needs to know its position locally, then the LS signals the gNB/eNB to send that information to the UE.

Figure 3:
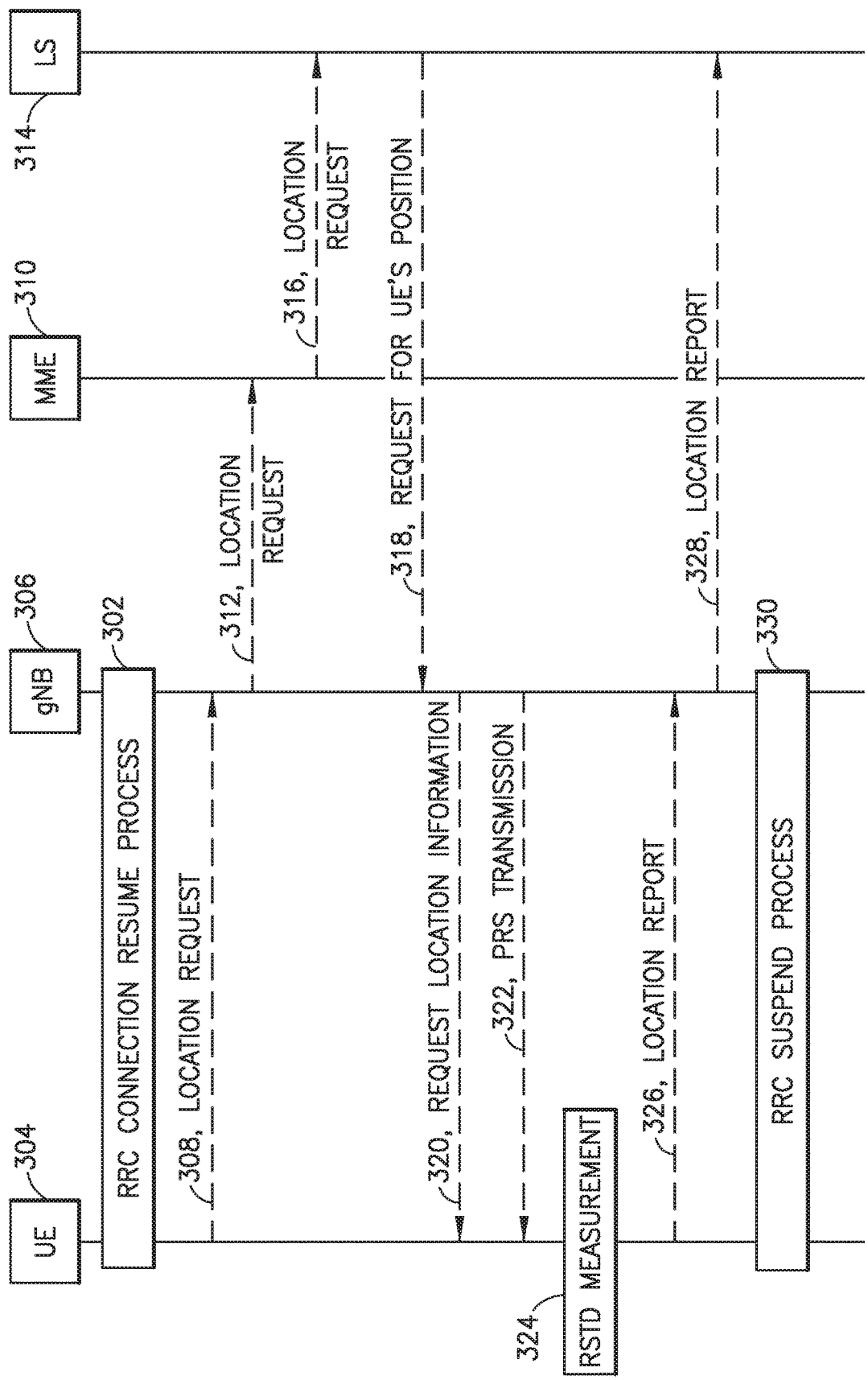
FIG. 3 illustrates the signaling for positioning when initiated by the UE according to the prior art.

As mentioned above, the present invention has the additional advantage over the prior art in that a positioning request may be initiated by the UE. FIG. 3 shows the signaling flow under prior art for the procedure in the case when the positioning request is initiated by the UE. FIG. 4 then shows the signaling flow under the present invention.

Turning first to FIG. 3, an RRC connection resume process 302 is initiated between UE 304 and gNB 306. Then, UE 304 makes a request to gNB 306 whether location information for UE 304 is required in signal 308. In turn, gNB 306 makes a request to mobility management entity (MME) 310 whether location information for UE 304 is required in signal 312, and MME 310 passes the request along to location server (LS) 314 in signal 316. Subsequently, LS 314 sends a request to the gNB 306 for the position of UE 304 in signal 318. In turn, gNB 306 requests location information from UE 304 in signal 320, and makes a positioning reference signal (PRS) transmission to UE 304 in signal 322. Next, UE 304 performs a reference signal time difference (RSTD) measurement 324, and sends a location report to gNB 306 in signal 326. In turn, gNB 306 passes the location report along to the location server in signal 328. An RRC suspend process 330 between UE 304 and gNB 306 finally occurs.

According to the simplified signaling shown in FIG. 4 for the present invention, UE 402 "determines a location request and listens for the next positioning reference signal (PRS)" 404. Subsequently, gNB 406 transmits PRS to UE 402 in signal 408. Next, UE 402 performs a reference signal time difference (RSTD) measurement 410, and sends a location report via EDT/SDT to gNB 406 in signal 412. Then, gNB 406 makes a request to mobility management entity (MME) 414 whether location information for UE 402 is required in signal 416, and MME 414 passes the request along to location server (LS) 418 in signal 420. Subsequently, LS 418 sends a request to the gNB 406 for the position of UE 402, which is in an RRC_idle state, in signal 422. Finally, gNB 406 passes the location report along to the location server 418 in signal 424 to complete the signaling process.

It should be noted that the RRC connection resume process 302, the "UE 304 makes a request to gNB 306 whether location information for UE 304 is required in signal 308", the "gNB 306 requests location information from UE 304 in signal 320", and the RRC suspend process 330 have been removed and do not appear in FIG. 4 as they are not necessary with the present invention.

In the signaling shown here, a single gNB is involved. As described above, when the UE has moved to another cell, the suspend ID will indicate to another gNB that a location report received should be forwarded on to the location server. This procedure would be transparent to the location server as it will just wait for the location report.

When a UE is in the RRC_connected state, it can be configured to communicate with the network using the defined NR physical channels (e.g. PUSCH). If the UE is in RRC_idle or RRC_inactive state, it must first transition to be in RRC_connected state prior to using the typical NR traffic channels. As noted in FIG. 3, this connection process requires signaling 302 between the UE 304 and the gNB 306. This signaling 302 requires power consumption by the UE 304.

It should be noted that for illustrative purposes in the present disclosure it is assumed that positioning reference signal (PRS) transmission is being used for OTDOA measurements. In new radio (NR), the PRS has not yet been defined, and other reference signals are being considered for OTDOA. The present invention will work in case another reference signal (RS) is used for OTDOA (for example, demodulation reference signal, common reference signal, or synchronization signal), and will cover a case where a reference signal other than PRS is used for OTDOA.

As previously indicated, a major advantage of the present invention is that the UE does not need to enter RRC_connected mode in order to position via OTDOA. This allows the UE to use less power than previously possible using OTDOA. In particular, for IoT UEs this is very attractive. From the network perspective, this reduces the overhead and radio resources significantly. As a result, the network can support positioning for a large number of UEs which now do not need to be RRC_connected. It is possible that this procedure will also have lower latency, as the UE does not need to go through an RRC setup procedure. In particular, for higher positioning accuracies expected in the future, having low latency will be necessary.

Figure 5:
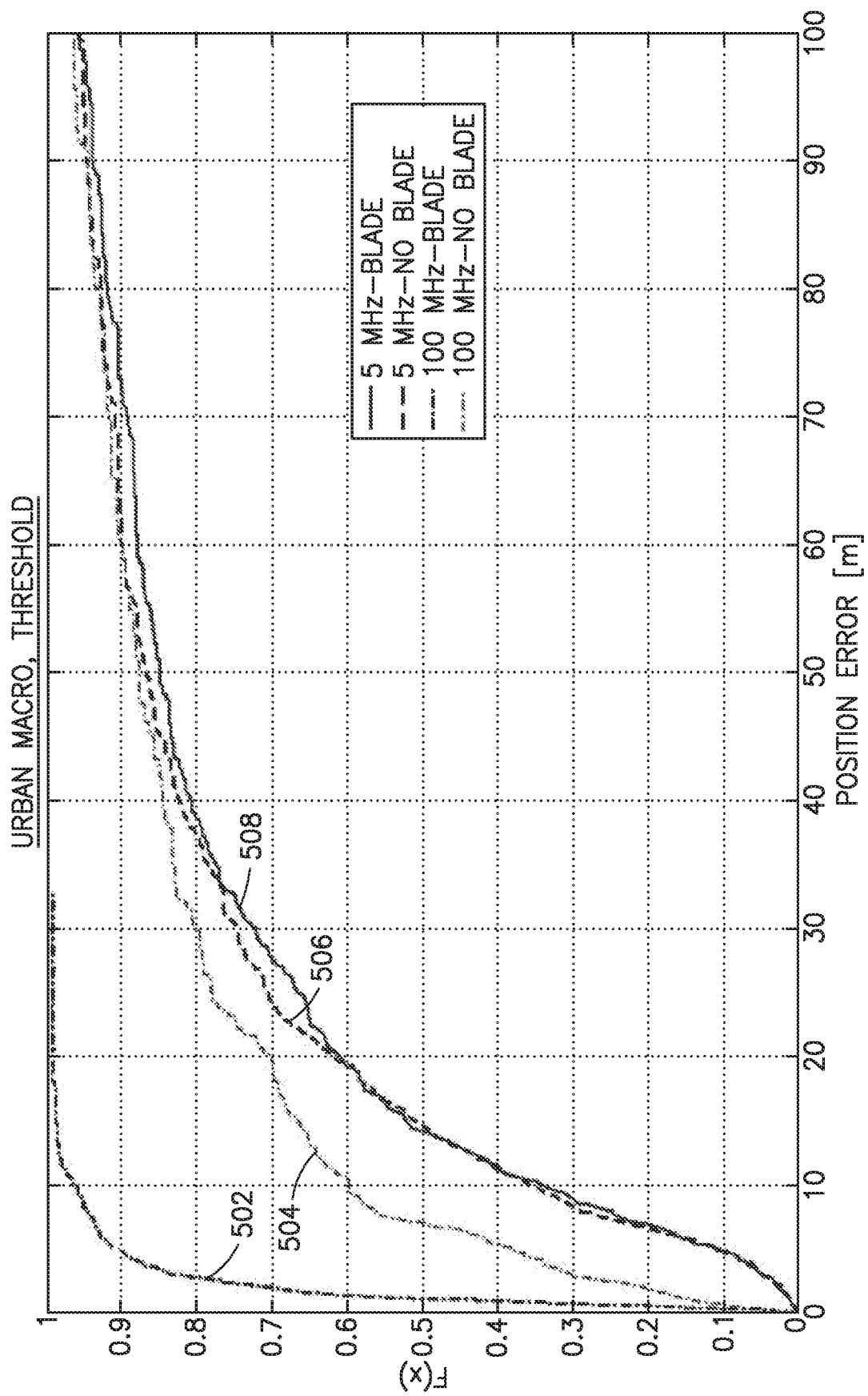
FIG. 5 illustrates OTDOA performance in a new radio urban macro evaluation scenario for positioning.
Figure 6:
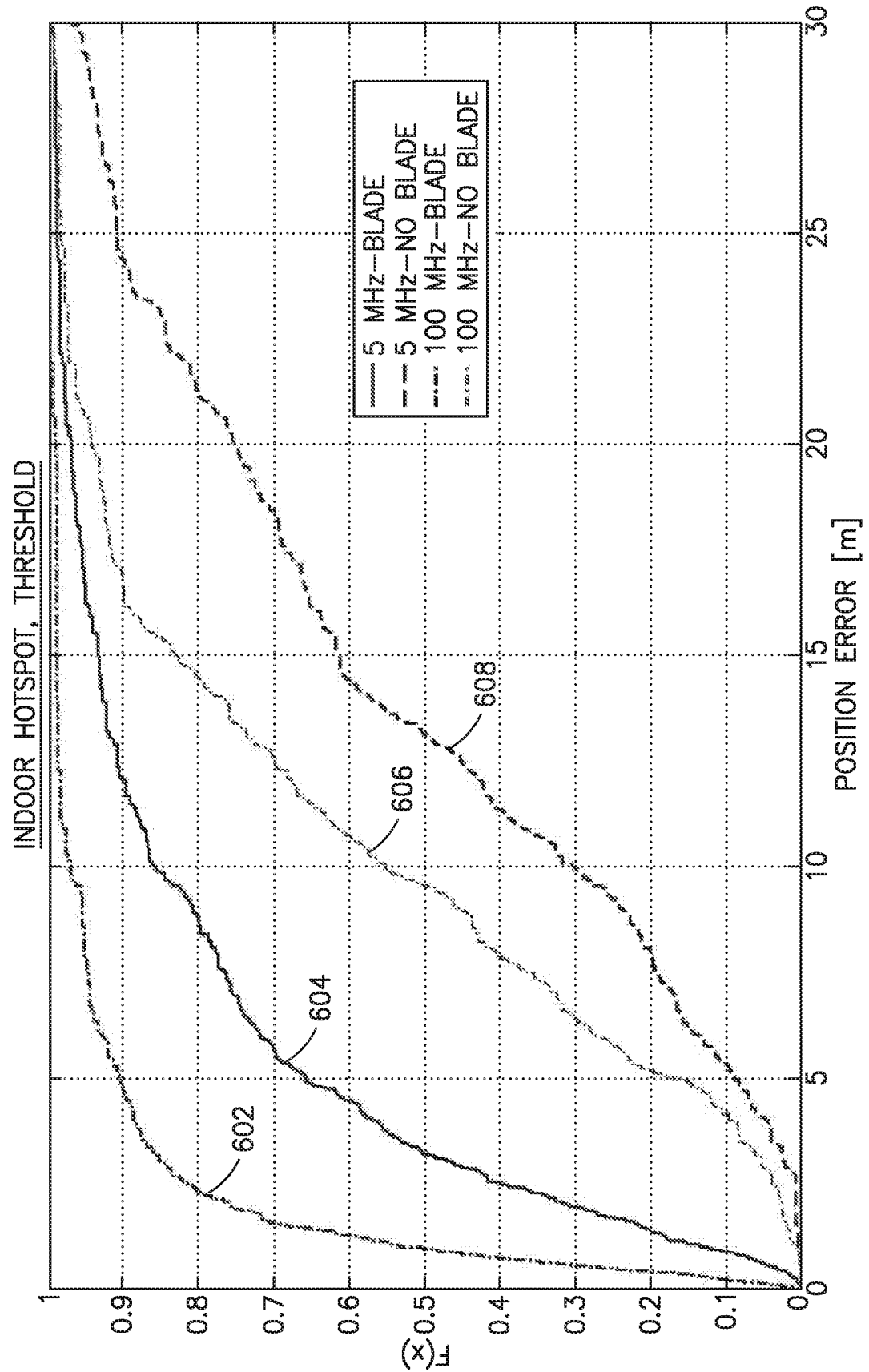
FIG. 6 illustrates OTDOA performance in a new radio indoor hotspot evaluation scenario for positioning.

Evaluations show that OTDOA will again be a leading positioning solution in NR, as it was in LTE. The horizontal positioning accuracy is the main performance metric of a positioning solution and OTDOA has quite good performance in NR, but there is further room for improvement. FIG. 5 shows the cumulative distribution function (CDF) of the achievable horizontal positioning accuracy of OTDOA in the Urban Macro (UMa) scenario. The UMa scenario is of importance for positioning as the Federal Communications Commission (FCC) has mandated that the regulatory requirements for horizontal accuracy are met for 80% of the UEs in a network. The results show that OTDOA can meet these regulatory requirements. FIG. 6 shows the CDF of the achievable horizontal positioning accuracy of OTDOA in the indoor hotspot (InH) scenario. This latter scenario is likely to have many IoT use cases in the future, and FIG. 6 shows that the positioning performance of OTODA is already quite suitable for many applications.

A key to the graphs presented in FIGS. 5 and 6 is provided in the table below.

| Plot | FIG. 5 | FIG. 6 |
|---|---|---|
| 5 MHz - BLADE | 508 | 604 |
| 5 MHz - No BLADE | 506 | 608 |
| 100 MHz - BLADE | 502 | 602 |
| 100 MHz - No BLADE | 504 | 606 |

Figure 7:
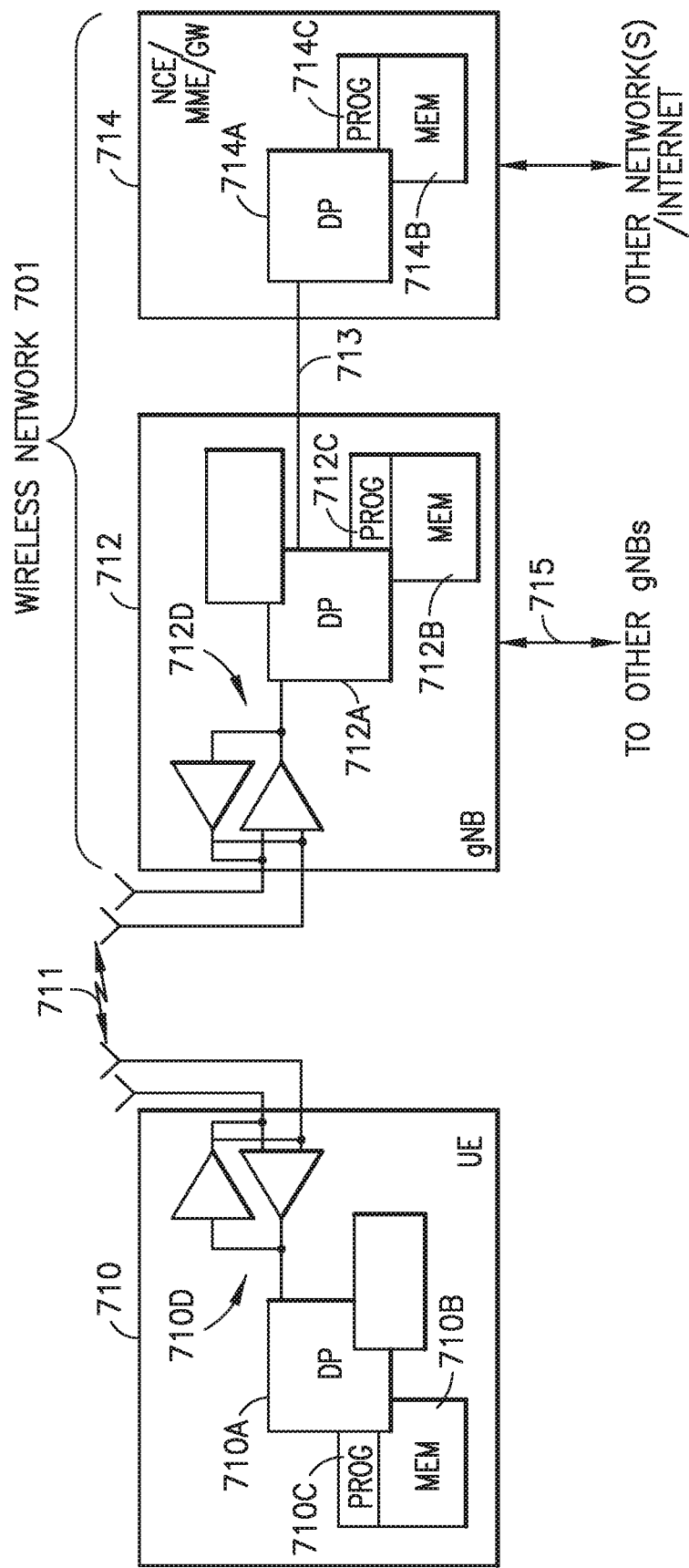
FIG. 7 shows a simplified block diagram of certain apparatus according to various exemplary embodiments of the present invention.

Reference is now made to FIG. 7 for illustrating a simplified block diagram of various electronic devices and apparatus that are suitable for use in practicing an exemplary embodiment of the present invention. In FIG. 7, a wireless network 701 is adapted for communication over a wireless link 711 with an apparatus, such as a mobile communication device, which is referred to as a UE 710, via a wireless network access node, such as a base station or relay station or remote radio head, and more specifically shown as a gNodeB (gNB) 712. The network 701 may include a network control element (NCE) 714, which serves as an access and mobility management function or entity (AMF or MME) and/or a serving gateway (S-GW) to a broader network, such as a public switched telephone/data network and/or the Internet.

The UE 710 includes a controller, such as a computer or a data processor (DP) 710A, a computer-readable memory medium embodied as a memory (MEM) 710B, which stores a program of computer instructions (PROG) 710C, and a suitable radio frequency (RF) transmitter and receiver 710D for bi-directional wireless communications with the gNodeB (gNB) 712 via one or more antennas. The gNodeB 712 also includes a controller, such as a computer or a data processor (DP) 712A, a computer-readable memory medium embodied as a memory (MEM) 712B that stores a program of computer instructions (PROG) 712C, and a suitable RF transmitter and receiver 712D for communication with the UE 710 via one or more antennas. The gNodeB 712 is coupled via a data/control path 713 to the NCE 714. The path 713 may be implemented as an S1 interface when the network 701 is an LTE network. The gNodeB 712 may also be coupled to another gNodeB via data/control path 715, which may be implemented as an X2 interface when the network 701 is an LTE network.

At least one of the PROGs 710C and 712C is assumed to include program instructions that, when executed by the associated DP, enable the device to operate in accordance with the exemplary embodiments of this invention as was detailed above with respect to FIGS. 2, 4, 5, and 6. That is, the exemplary embodiments of this invention may be implemented at least in part by computer software executable by the DP 710A of the UE 710 and/or by the DP 712A of the gNodeB 712, or by hardware, or by a combination of software and hardware (and firmware).

In general, the various embodiments of the UE 710 can include, but are not limited to, cellular telephones; personal digital assistants (PDAs) having wireless communication capabilities; portable computers having wireless communication capabilities; image capture devices, such as digital cameras, having wireless communication capabilities; gaming devices having wireless communication capabilities; music storage and playback appliances having wireless communication capabilities; and Internet appliances permitting wireless Internet access and browsing, as well as portable units or terminals that incorporate combinations of such functions.

The computer-readable MEMs 710B, 712B, 714B may be of any type suitable to the local technical environment and may be implemented using any suitable data storage technology, such as semiconductor-based memory devices, flash memory, magnetic-memory devices and systems, optical-memory devices and systems, fixed memory and removable memory. The DPs 710A, 712A, 714A may be of any type suitable to the local technical environment, and may include one or more general purpose computers, special purpose computers, microprocessors, digital signal processors (DSPs) and processors based on a multicore processor architecture, as non-limiting examples.

It should be noted that the various DPs 710A, 712A, 714A may be implemented as one or more processors/chips, either or both of the UE 710 and the gNodeB 712 may include more than one transmitter and/or receiver 710D, 712D, and particularly the gNodeB 712 may have its antennas mounted remotely from the other components of the gNodeB 712, such as for example tower-mounted antennas.

Figure 8:
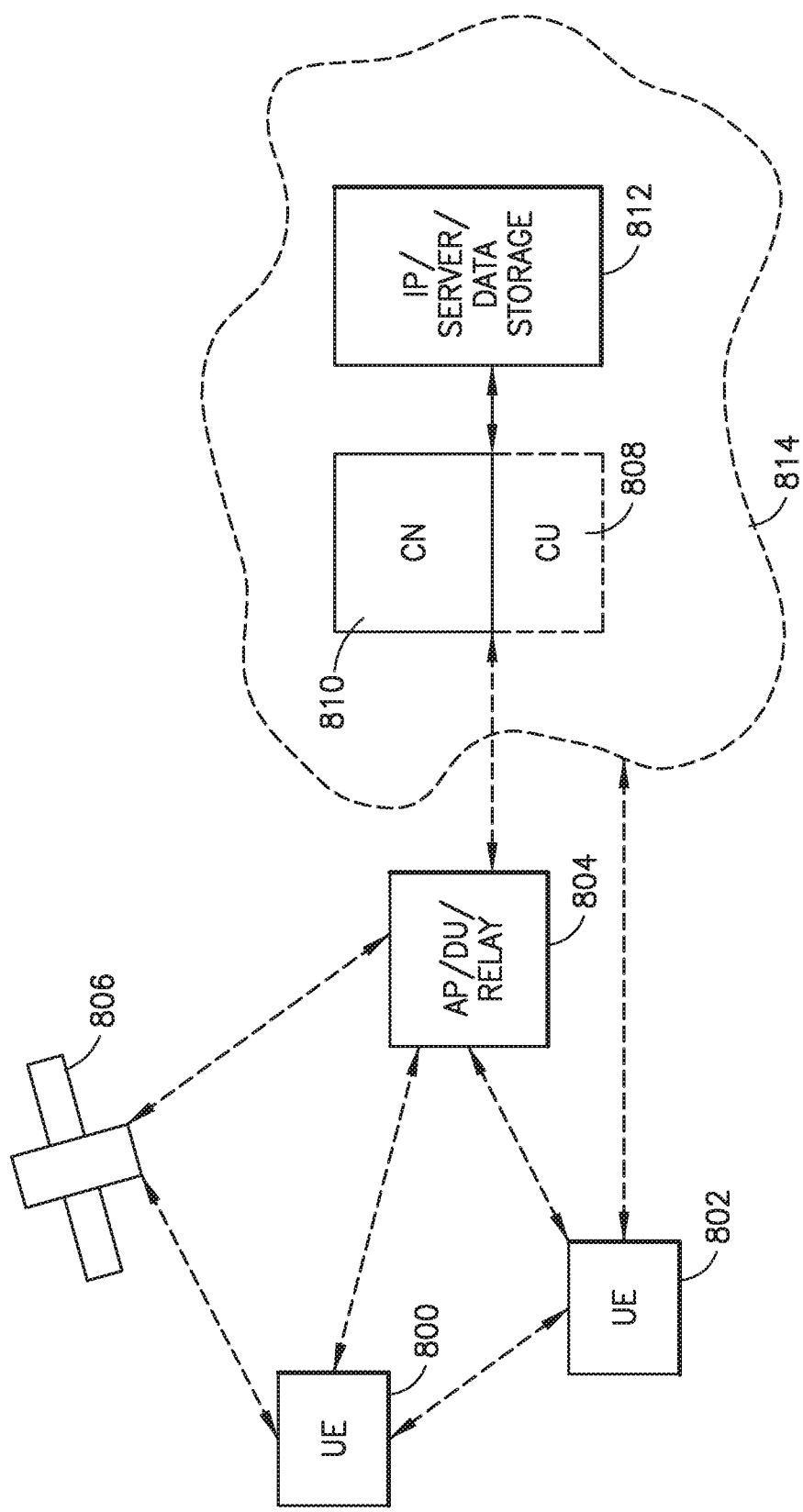
FIG. 8 shows part of another exemplary radio network.

Reference is now made to FIG. 8 for illustrating a simplified block diagram of various electronic devices and apparatus that are suitable for use in practicing another exemplary embodiment of the present invention. In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), and Internet Protocol multimedia subsystems (IMS) or any combination thereof.

FIG. 8 depicts examples of simplified system architectures only showing some elements and functional entities, all being logical units, whose implementation may differ from what is shown. The connections shown in FIG. 8 are logical connections; the actual physical connections may be different. It is apparent to a person skilled in the art that the system typically comprises also other functions and structures than those shown in FIG. 8.

The embodiments are not, however, restricted to the system given as an example, but a person skilled in the art may apply the solution to other communication systems provided with necessary properties.

The example of FIG. 8 shows a part of an exemplifying radio access network.

FIG. 8 shows user devices 800 and 802 configured to be in a wireless connection on one or more communication channels in a cell with an access node (such as (e/g)NodeB) 804 providing the cell. The physical link from a user device to a/an (e/g)NodeB is called uplink or reverse link and the physical link from the (e/g)NodeB to the user device is called downlink or forward link. It should be appreciated that (e/g)NodeBs or their functionalities may be implemented by using any node, host, server, or access point, etc., entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system to which it is coupled. The NodeB may also be referred to as a base station, an access point, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 810 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in an Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 8, user devices may include two antennas. The number of reception and/or transmission antennas may naturally vary according to a current implementation.

Additionally, although the apparatuses have been depicted as single entities, different units, processors and/or memory units (not all shown in FIG. 8) may be implemented.

5G enables the use of multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC)), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 812, or utilize services provided by them. The communication network may also be able to support the usage of cloud services, for example, at least part of core network operations may be carried out as a cloud service (this is depicted in FIG. 8 by "cloud" 814). The communication system may also comprise a central control entity, or the like, providing facilities for networks of different operators to cooperate, for example, in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 804) and non-real time functions being carried out in a centralized manner (in a centralized unit, CU 808).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example, by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 806 in the mega-constellation may cover several satellite-enabled network entities that create on-ground cells. The on-ground cells may be created through an on-ground relay node 804 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home (e/g)nodeB. Additionally, in a geographical area of a radio communication system, a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 8 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 8). An HNB Gateway (HNB-GW), which is typically installed within an operator's network may aggregate traffic from a large number of HNBs back to a core network.

Figure 9:
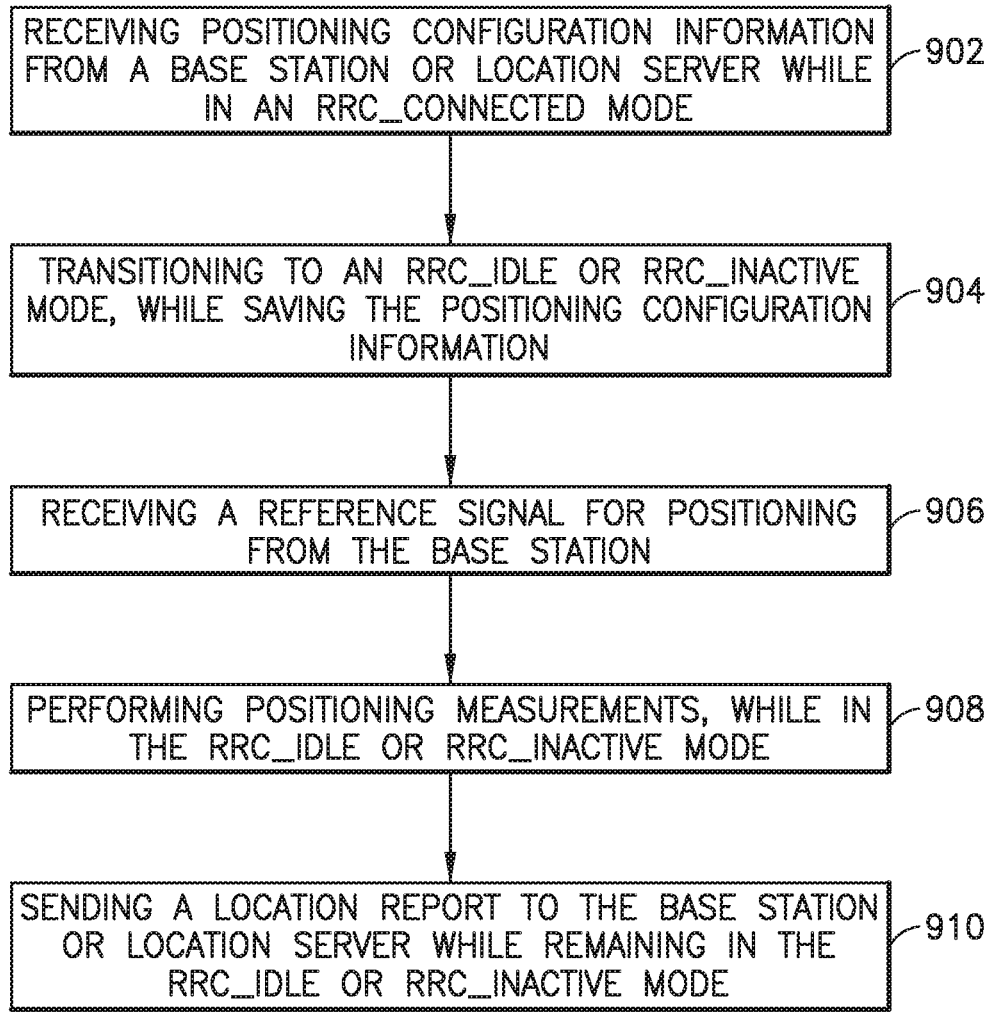
FIG. 9 is a flow chart illustrating a method performed by a user equipment in accordance with the present disclosure.

FIG. 9 is a flow chart illustrating a method performed by a user equipment in accordance with the present disclosure. In block 902, the user equipment receives positioning configuration information from a base station or location server while in an RRC_connected mode. In block 904, the user equipment transitions to an RRC_idle or RRC_inactive mode, while saving the positioning configuration information. In block 906, the user equipment receives a reference signal for positioning from the base station. In block 908, the user equipment performs positioning measurements, while in the RRC_idle or RRC_inactive mode. And, in block 910, the user equipment sends a location report to the base station or location server while remaining in the RRC_idle or RRC_inactive mode.

Figure 10:
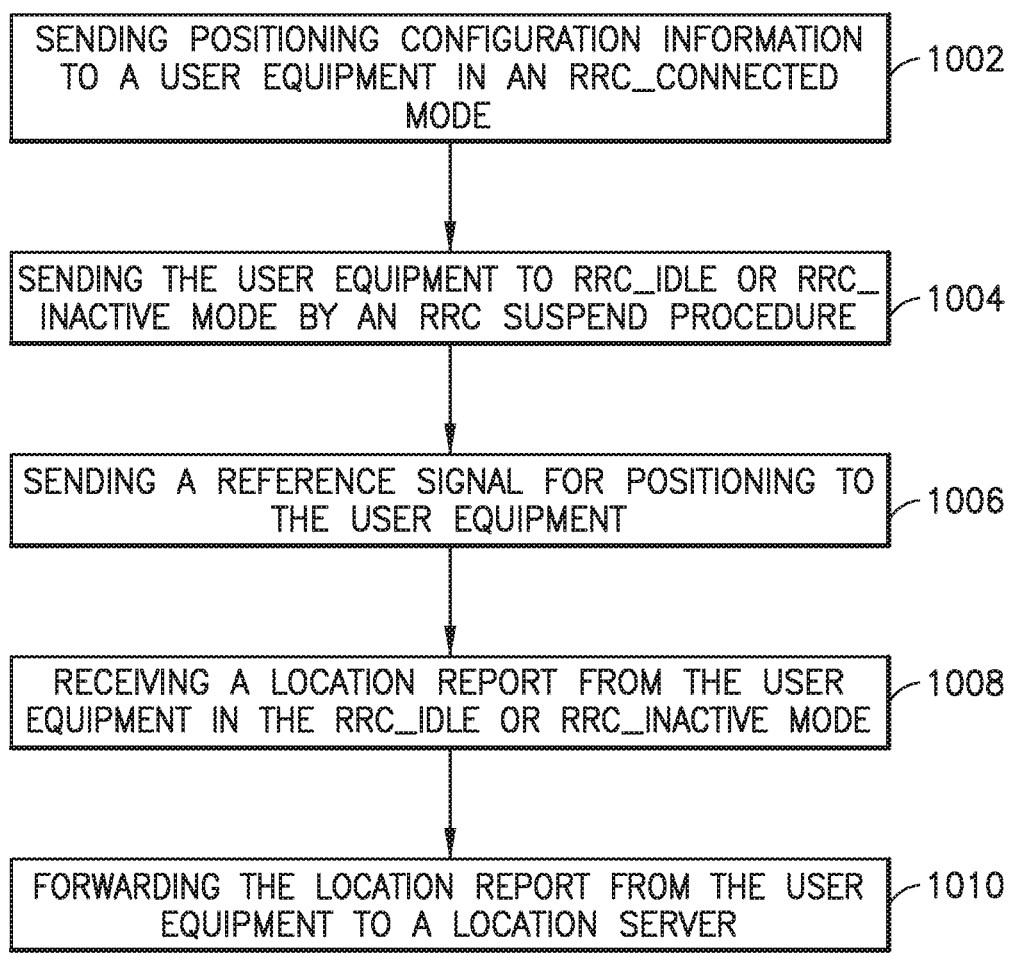
FIG. 10 is a flow chart illustrating a method performed by a base station in accordance with the present disclosure.

FIG. 10 is a flow chart illustrating a method performed by a base station in accordance with the present disclosure. In block 1002, the base station sends positioning configuration information to a user equipment in an RRC_connected mode. In block 1004, the base station sends the user equipment to RRC_idle or RRC_inactive mode by an RRC suspend procedure. In block 1006, the base station sends a reference signal for positioning to the user equipment. In block 1008, the base station receives a location report from the user equipment in the RRC_idle or RRC_inactive mode. And, in block 1010, the base station forwards the location report from the user equipment to a location server.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

The following abbreviations have been used in the preceding discussion:
CDF Cumulative Distribution Function
EDT Early Data Transmission
E-SMLC Enhanced Serving Mobile Location Center
FCC Federal Communications Commission
gNB gNodeB (5G Base Station)
ID Identity
InH Indoor Hotspot
IoT Internet of Things
LPP LTE Positioning Protocol
LS Location Server
LTE Long Term Evolution
MBMS Multimedia Broadcast and Multicast Service
MME Mobility Management Entity
NR New Radio (5G)
OTDOA Observed Time Difference of Arrival
PRACH Physical Random Access Channel
PRS Positioning Reference Signal
RAN Radio Access Network
RAT Radio Access Technology
RF Radio Frequency
RRC Radio Resource Control
RS Reference Signal
RSTD Reference Signal Time Difference
SDT Small Data Transmission
SIB System Information Block
TDOA Time Difference of Arrival
TOA Time of Arrival
UE User Equipment
UMa Urban Macro
3GPP $3^{rd}$ Generation Partnership Project The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method comprising:
   receiving, by a user equipment, positioning configuration information from a base station or location server while in a radio resource control connected mode;
   receiving, by the user equipment, a suspend identification via a radio resource control suspend or release procedure, wherein the suspend identification is reserved for positioning when the user equipment is in a radio resource control idle or inactive mode;
   transitioning to the radio resource control idle or inactive mode, while saving said positioning configuration information;
   receiving, by the user equipment in the radio resource control idle or inactive mode, a paging message comprising an indication to perform positioning measurement;
   receiving a reference signal for positioning from the base station;
   performing positioning measurements based at least in part on the positioning configuration information and the reference signal, while in the radio resource control idle or inactive mode; and
   sending a location report to the base station or location server while remaining in the radio resource control idle or inactive mode.

2. The method as claimed in claim 1, wherein the location report is sent using a data transmission scheme during random access procedure.

3. The method as claimed in claim 1, wherein said positioning configuration information comprises observed time difference of arrival and reference signal for positioning configuration information, and wherein said positioning measurements are reference signal time difference measurements.

4. The method as claimed in claim 1, wherein the location report comprises the suspend identification.

5. The method as claimed in claim 1, wherein the suspend identification is one of a predetermined set of identifications reserved for positioning in the radio resource control idle or inactive mode.

6. An apparatus comprising:
   at least one processor; and
   at least one memory including computer program code, the at least one memory and the computer program code being configured, with the at least one processor, to cause the apparatus to at least:
   receive positioning configuration information from a base station or location server while in a radio resource control connected mode;
   receive a suspend identification via a radio resource control suspend or release procedure, wherein the suspend identification is reserved for positioning when the apparatus is in a radio resource control idle or inactive mode;
   transition to the radio resource control idle or inactive mode, while saving said positioning configuration information;
   receive, by the apparatus in the radio resource control idle or inactive mode, a paging message comprising an indication to perform positioning measurement;
   receive a reference signal for positioning from the base station;

perform positioning measurements based at least in part on the positioning configuration information and the reference signal, while in the radio resource control idle or inactive mode; and send a location report to the base station or location server while remaining in the radio resource control idle or inactive mode.

7. The apparatus as claimed in claim 6, wherein the location report is sent using a data transmission scheme during random access procedure.

8. The apparatus as claimed in claim 6, wherein said positioning configuration information comprises observed time difference of arrival and reference signal for positioning configuration information, and wherein said positioning measurements are reference signal time difference measurements.

9. The apparatus as claimed in claim 6, wherein the location report comprises the suspend identification.

10. The apparatus as claimed in claim 9, wherein the at least one memory and the computer program code are further configured, with the at least one processor, to cause the apparatus to:

in response to determining the apparatus has moved to another cell served by another base station, send the location report with the suspend identification to the other base station.

11. The apparatus as claimed in claim 6, wherein the suspend identification is one of a predetermined set of identifications reserved for positioning in the radio resource control idle or inactive mode.

12. The apparatus as claimed in claim 7, wherein the data transmission scheme is an early data transmission scheme or small data transmission scheme.

13. An apparatus comprising:
at least one processor; and
at least one memory including computer program code, the at least one memory and the computer program code being configured, with the at least one processor, to cause the apparatus to at least:

send positioning configuration information to a user equipment in a radio resource control connected mode;

assign a suspend identification via a radio resource control suspend or release procedure, wherein the suspend identification is reserved for positioning when the user equipment is in a radio resource control idle or inactive mode;

cause the user equipment to transition to the radio resource control idle or inactive mode by a radio resource control release or suspend procedure;

send, to the user equipment in the radio resource control idle or inactive mode, a paging message comprising an indication to perform positioning measurement;

send a reference signal for positioning to the user equipment;

receive a location report from the user equipment in the radio resource control idle or inactive mode; and forward the location report to a location server.

14. The apparatus as claimed in claim 13, wherein the at least one memory and the computer program code are further configured, with the at least one processor, to cause the apparatus to:

receive a request from the location server for a position of the user equipment.

15. The apparatus as claimed in claim 13, wherein said positioning configuration information comprises observed time difference of arrival and reference signal for positioning configuration information.

16. The apparatus as claimed in claim 13, wherein the location report comprises the suspend identification.

17. The apparatus as claimed in claim 13, wherein the suspend identification is one of a predetermined set of identifications reserved for positioning in radio resource control idle or inactive mode.

\* \* \* \* \*